(12) United States Patent
Chung et al.

(10) Patent No.: US 10,490,806 B2
(45) Date of Patent: Nov. 26, 2019

(54) POSITIVE ELECTRODE MATERIAL OF SECONDARY BATTERY AND PREPARATION METHOD THEREOF

(71) Applicant: LG Chem, Ltd., Seoul (KR)

(72) Inventors: Ju Ho Chung, Daejeon (KR); Gyu Ok Hwang, Daejeon (KR); Soo Ji Hwang, Daejeon (KR); Hong Kyu Park, Daejeon (KR)

(73) Assignee: LG Chem, Ltd. (KR)

(*) Notice: Subject to any disclaimer, the term of this patent is extended or adjusted under 35 U.S.C. 154(b) by 0 days.

(21) Appl. No.: 15/035,293

(22) PCT Filed: Jul. 8, 2015

(86) PCT No.: PCT/KR2015/007092
§ 371 (c)(1),
(2) Date: May 9, 2016

(87) PCT Pub. No.: WO2016/006935
PCT Pub. Date: Jan. 14, 2016

(65) Prior Publication Data
US 2016/0293934 A1  Oct. 6, 2016

(30) Foreign Application Priority Data

Jul. 11, 2014  (KR) .................. 10-2014-0087389
Jul. 7, 2015   (KR) .................. 10-2015-0096499

(51) Int. Cl.
| | |
|---|---|
| H01M 4/131 | (2010.01) |
| H01M 4/62 | (2006.01) |
| H01M 4/485 | (2010.01) |
| H01M 4/525 | (2010.01) |
| H01M 10/0525 | (2010.01) |
| H01M 4/04 | (2006.01) |
| H01M 4/52 | (2010.01) |

(52) U.S. Cl.
CPC .......... *H01M 4/131* (2013.01); *H01M 4/523* (2013.01); *H01M 4/525* (2013.01)

(58) Field of Classification Search
None
See application file for complete search history.

(56) References Cited

U.S. PATENT DOCUMENTS

| | | | |
|---|---|---|---|
| 5,053,297 A | 10/1991 | Yamahira et al. | |
| 5,720,932 A | 2/1998 | Amine et al. | |
| 6,818,347 B1* | 11/2004 | Jin | H01M 4/244 429/206 |
| 7,858,234 B2 | 12/2010 | Morishima et al. | |
| 2001/0000484 A1* | 4/2001 | Lv | H01M 4/32 429/218.2 |
| 2004/0156986 A1* | 8/2004 | Yadav | B82Y 30/00 427/180 |
| 2005/0130042 A1* | 6/2005 | Liu | C01G 45/1242 429/231.3 |
| 2006/0068289 A1 | 3/2006 | Paulsen et al. | |
| 2006/0216529 A1* | 9/2006 | Barker | C03C 8/14 428/432 |
| 2006/0222941 A1 | 10/2006 | Yamashita et al. | |
| 2007/0031735 A1* | 2/2007 | Nishimura | H01M 4/04 429/317 |
| 2007/0059602 A1 | 3/2007 | Morishima et al. | |
| 2008/0075653 A1* | 3/2008 | Hoshino | B82Y 30/00 423/594.19 |
| 2008/0118841 A1 | 5/2008 | Kim et al. | |
| 2009/0217513 A1* | 9/2009 | Xi | C01G 45/1228 29/623.2 |
| 2010/0187471 A1 | 7/2010 | Paulsen et al. | |
| 2011/0104569 A1 | 5/2011 | Sugaya et al. | |
| 2011/0244324 A1 | 10/2011 | Jang | |
| 2012/0009476 A1 | 1/2012 | Park et al. | |
| 2012/0037846 A1 | 2/2012 | Lee et al. | |
| 2012/0068125 A1* | 3/2012 | Yoshitake | B01J 23/78 252/511 |
| 2013/0036944 A1* | 2/2013 | Nuccetelli | C09C 1/24 106/453 |
| 2013/0122370 A1 | 5/2013 | Rho et al. | |
| 2013/0224585 A1 | 8/2013 | Oh et al. | |
| 2016/0308215 A1* | 10/2016 | Miyata | H01M 4/13 |

FOREIGN PATENT DOCUMENTS

| | | |
|---|---|---|
| CN | 1841814 A | 10/2006 |
| CN | 102315443 A | 1/2012 |
| CN | 102376946 A | 3/2012 |
| CN | 103262309 A | 8/2013 |
| EP | 1923352 A2 | 5/2008 |
| EP | 2592677 A1 | 5/2013 |
| JP | H02265167 A | 10/1990 |
| JP | H06342673 | 12/1994 |
| JP | H08306360 A | 11/1996 |
| JP | H10162810 A | 6/1998 |
| JP | H10208748 A | 8/1998 |
| JP | 2001273903 A | 10/2001 |
| JP | 2006190528 | 7/2006 |
| JP | 2006278267 A | 10/2006 |
| JP | 2007080738 A | 3/2007 |

(Continued)

OTHER PUBLICATIONS

Extended European Search Report for Application No. 15819632.9 dated Jul. 20, 2017, 5 pages.

(Continued)

*Primary Examiner* — Tanisha Diggs
(74) *Attorney, Agent, or Firm* — Lerner, David, Littenberg, Krumholz & Mentlik, LLP

(57) ABSTRACT

The present disclosure provides a positive electrode material comprising: a positive electrode active material mixture comprising a positive electrode active material prepared with an active material precursor and a lithium compound, a conductive agent and a binder; and an active material precursor as an additive, in which the active material precursor as the additive is a same substance as the active material precursor as a material of the positive electrode active material.

8 Claims, 1 Drawing Sheet

(56) References Cited

FOREIGN PATENT DOCUMENTS

| | | |
|---|---|---|
| KR | 100354948 | 10/2002 |
| KR | 20120004340 A | 1/2012 |
| KR | 20120022554 A | 3/2012 |
| KR | 20120138344 A | 12/2012 |
| KR | 2013-0031079 A | 3/2013 |
| KR | 101297385 B1 | 8/2013 |
| KR | 101372053 B1 | 3/2014 |
| WO | 2006033525 A1 | 3/2006 |

OTHER PUBLICATIONS

International Search Report from PCT/KR2015/007092, dated Oct. 12, 2015.
Search Report from Chinese Office Action dated Jul. 30, 2018 in CN20150033736.1.

* cited by examiner

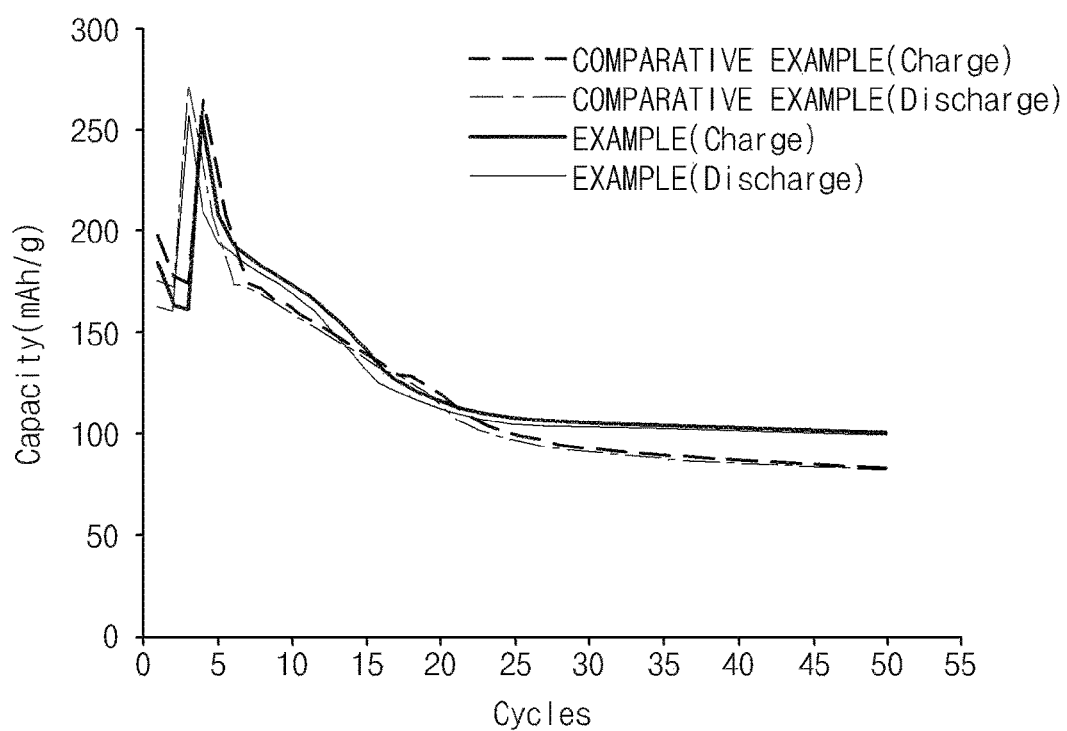

POSITIVE ELECTRODE MATERIAL OF SECONDARY BATTERY AND PREPARATION METHOD THEREOF

CROSS-REFERENCE TO RELATED APPLICATION

This application is a national phase entry under 35 U.S.C. § 371 of International Application No. PCT/KR2015/007092 filed Jul. 8, 2015, published in Korean, which claims priority to Korean Patent Application No. 10-2014-0087389, filed on Jul. 11, 2014 and Korean Patent Application No. 10-2015-0096499, filed on Jul. 7, 2015 the disclosures of which are incorporated herein by reference.

TECHNICAL FIELD

An exemplary embodiment of the present disclosure relates to a positive electrode material of a secondary battery and a preparation method thereof.

BACKGROUND ART

Recent development in mobile communications and information and electronic industry has created continuously increasing demand for the secondary batteries which are light-weighted, but provide high capacity. However, when overcharged or short-circuited, the secondary batteries can generate excessive heat, which can possibly lead into fire or explosion. When over-discharged below normal voltage range, capacity rapidly decreases and the batteries can enter into such a state that it is not possible to use the batteries.

For these reasons, batteries have always been equipped with safety devices such as protection circuits and PTC since they have been first developed. However, the protection circuits and PTC are expensive and occupy considerable volume, leading to undesirably increased battery price, volume and weight. Accordingly, development of a battery is necessary, which can reduce production cost without protection circuits and PTC, and also can increase capacity of the battery.

The related technologies solve safety issues by incorporating organic or inorganic additives into the non-aqueous electrolyte solution or by altering the outer structure of the battery in case of battery overcharge or short-circuit. However, when the battery is over-discharged below a rated voltage, the capacity can have been rapidly declined to the level that it is difficult to charge or discharge further by the time the battery is charged again.

The general secondary lithium battery developed so far is configured in such a structure that the negative electrode discharge is limited and thus is cutoff in case of over-discharge. Specifically, at initial charging, the non-aqueous secondary lithium battery is formed with a solid electrolyte interface (SEI) film on the surface of the negative electrode, and at this time, a large amount of lithium ions released from the positive electrode is used. Accordingly, the amount of Li participating in charging and discharging is declined. When the battery is subjected to over-discharge with this reduced Li amount, the activated Li sites of the positive electrode are not completely filled and this leads into the phenomenon that the voltage of the positive electrode is kept from declining to below a predetermined voltage. Accordingly, discharging is ended by the negative electrode.

Meanwhile, the reason for rapid capacity decline after over-discharge is as follows. The battery voltage is defined by the voltage difference between positive electrode and negative electrode, and if a battery is continuously discharged at low current even after the voltage drop below a general threshold voltage, the voltage of the positive electrode is kept from further drop due to Li ion consumption at the negative electrode. As a result, while the voltage of the positive electrode is on a gradual decline, the voltage of the negative electrode is on a relatively rapid rise, reaching 3.6V at which the copper foil used as a current collector of the negative electrode is oxidized. In the example described above, the copper foil is melt into copper ion state, contaminating the electrolyte and adhered to the surface of the negative electrode. After that, it is not possible to use the negative electrode active material. As described, when the copper foil is subjected to oxidation, capacity is rapidly reduced after over-discharge so that it is not possible to use the battery anymore.

Accordingly, development of a battery is necessary, which limits discharge by the positive electrode and thus prevents considerable reduction of the battery capacity, and development of a new method is also necessary, which can produce such positive electrode-limited battery.

DISCLOSURE

Technical Problem

A technical objective of an exemplary embodiment of the present disclosure is to provide a positive electrode material of a secondary battery with enhanced over-discharge characteristic, and a preparation method thereof.

Technical Solution

In order to achieve the objectives mentioned above, an exemplary embodiment of the present disclosure provides a positive electrode material comprising: a positive electrode active material mixture comprising a positive electrode active material prepared with an active material precursor and a lithium compound, a conductive agent and a binder; and an active material precursor as an additive, in which the active material precursor as the additive is a same substance as the active material precursor as the material of the positive electrode active material.

According to another exemplary embodiment of the present disclosure, a preparation method of a positive electrode material is provided, including steps of: (a) preparing a positive electrode active material with an active material precursor and a lithium compound; and (b) mixing the prepared positive electrode active material, a conductive agent, a binder, and an active material precursor as an additive.

According to yet another exemplary embodiment of the present disclosure, a positive electrode comprising the positive electrode material described above is provided.

Advantageous Effects

According to an exemplary embodiment of the present disclosure, the positive electrode material additionally includes, as an additive, the active material precursor, the same material as used for the preparation of the positive electrode active material, so that the positive electrode suppresses Li consumption at the negative electrode when discharge continues at low current during over-discharge. Accordingly, rapid rise of the negative electrode voltage is prevented, thus preventing copper Cu from melting. Furthermore, enhanced over-discharge characteristics, such as prevention of capacity reduction after over-discharge and enhanced capacity recovery can be provided.

DESCRIPTION OF DRAWINGS

FIG. 1 is a graph showing a result of capacity tests of the Example of the present disclosure and Comparative Examples.

MODE FOR INVENTION

Hereinbelow, certain embodiments of the present disclosure will be described in more detail.

An exemplary embodiment of the present disclosure relates to a positive electrode material comprising: a positive electrode active material mixture comprising a positive electrode active material prepared with an active material precursor and a lithium compound, a conductive agent and a binder; and an active material precursor as an additive.

The positive electrode material may additionally include the active material precursor as an additive for the preparation of the positive electrode material, in which the active material precursor added is the same substance as the active material precursor used as the material of the positive electrode active material, so that the positive electrode suppresses Li consumption at the negative electrode in the event of low-current continuous discharge after over-discharge. Accordingly, rapid rise of the negative electrode voltage is prevented, thus preventing copper Cu from melting. Furthermore, enhanced over-discharge characteristics, such as prevention of capacity reduction after over-discharge and enhanced capacity recovery can be provided.

The positive electrode active material may be prepared with the active material precursor and the lithium compound, and the active material precursor may be additionally contained in the positive electrode material along with the positive electrode active material, conductive agent and binder.

That is, since the positive electrode material according to an exemplary embodiment of the present disclosure includes an additive which is the same substance as the active material precursor used as the material of the positive electrode active material, the positive electrode can suppress Li consumption at the negative electrode in the event of low-current continuous discharge after over-discharge. Accordingly, rapid rise of the negative electrode voltage is prevented, thus preventing copper Cu from melting. Furthermore, enhanced over-discharge characteristics, such as prevention of capacity reduction after over-discharge and enhanced capacity recovery can be provided.

As used herein, by the statement that the "active material precursor as a material of the positive electrode active material is the same substance as the active material precursor as an additive", it means not only the narrow definition that the precursors have the same specific chemical formula, but also the broad definition that the precursors are same for these being used as the precursors of the active material, that is, in view of the fact that both precursors are the active material precursors, regardless of whether the precursors have the same or different formulas.

Without limitation, it may be more desirable to rely on the narrow definition of the "active material precursor as the material of the positive electrode being same as the active material precursor as an additive", according to which the precursors have the same specific chemical formula, for the purpose of enhanced over-discharge characteristic.

The active material precursor may be prepared into the positive electrode active material by being mixed with the lithium compound, and may include one, or two or more selected from the group consisting of manganese complex oxide precursor, iron phosphate complex oxide precursor, cobalt oxide precursor, nickel-cobalt oxide precursor, and nickel-cobalt-manganese complex oxide precursor.

The manganese complex oxide precursor may be expressed as a composition of the Formula 1 below.

$$[Mn_{1-x}M_x]_3O_4 \qquad \text{[Formula 1]}$$

where, $0 \leq x \leq 0.5$, and

M is one or more selected from the group consisting of Ni, Co, Fe, Cr, V, Cu, Zn, Ti, Al, Mg, and B.

The iron phosphate complex oxide precursor may be expressed as a composition of the Formula 2 below.

$$Fe_{1-x}M_x(PO_{4-b})X_b \qquad \text{[Formula 2]}$$

where, $0 \leq x \leq 0.5$, $0 \leq b \leq 0.1$,

M is one or more selected from the group consisting of Mn, Ni, Co, Fe, Cr, V, Cu, Zn, Ti, Al, Mg, and B, and X is one or more selected from the group consisting of F, S, and N.

The cobalt oxide precursor may include one, or two or more selected from the group consisting of $Co_2O_3$, and $Co_3O_4$.

The nickel-cobalt oxide precursor may be expressed as a composition of the Formula 3 below.

$$M(OH_{1-x})_2 \qquad \text{[Formula 3]}$$

where, M is one or more selected from the group consisting of Mn, Ni, Co, Al, and Mg, and $0 \leq x \leq 1$.

The nickel-cobalt-manganese complex oxide precursor may be expressed as a composition of the Formula 4 below.

$$M_yP \qquad \text{[Formula 4]}$$

where, $M=M'_{1-k}A_k$, where, M' is $Ni_{1-a-b}(Ni_{1/2}Mn_{1/2})_aCo_b$, $0.65 \leq a+b \leq 0.85$ and $0.1 \leq b \leq 0.4$, A is a dopant, $0 \leq k \leq 0.05$, $0.95 \leq y \leq 1.05$, and P is one or more selected from the group consisting of —OH, and —OOH.

The lithium compound used in the preparation of the positive electrode active material along with the active material precursor may be one, or two or more selected from the group consisting of lithium carbonate ($Li_2CO_3$), lithium hydroxide (LiOH), lithium nitrate ($LiNO_3$), and lithium hydrate ($LiOH.H_2O$), although it may be any of lithium compound generally used in the preparation of the positive electrode active material.

The active material precursor may be prepared into the positive electrode active material by being mixed with the lithium compound. A method for preparing a positive electrode active material by mixing the active material precursor with the lithium compound may use co-precipitation, solid-phase reaction, sol-gel method, supercritical hydrothermal method, and wet synthesis, although it may use any known preparation method of the positive electrode active material without limitation.

The positive electrode material according to an exemplary embodiment of the present disclosure may include a positive electrode active material, a conductive agent, a binder and an active material precursor.

The positive electrode active material may be prepared with the active material precursor and the lithium compound, in which an example of the positive electrode active material may include: lithium nickel manganese complex oxide (LNMO) expressed by formula $LiM_yO_2$ (where, M is $M'_{1-k}A_k$, M' is $Ni_{1-a-b}(N_{1/2}Mn_{1/2})_aCo_b$, $0.65 \le a+b \le 0.85$ and $0.1 \le b \le 0.4$, and, $0 \le k \le 0.05$, x+y=2, $0.95 \le y \le 1.05$); layered compound such as lithium cobalt oxide ($LiCoO_2$), lithium nickel oxide ($LiNiO_2$), or a compound substituted with one or more transition metals; lithium manganese oxide expressed by chemical formula such as $Li_{1+x}Mn_{2-x}O_4$ (where, x is 0~0.33), $LiMnO_3$, $LiMn_2O_3$, or $LiMnO_2$; lithium manganese complex oxide expressed by chemical formula $Li_2Mn_3MO_8$ (where, M=Fe, Co, Ni, Cu or Zn); $LiMn_2O_4$ with part of Li substituted with alkali earth metal ion; disulfide compound; lithium iron phosphate compound ($LiFePO_4$) expressed by $Fe_2(MoO_4)_3$, or chemical formula $Li_{1-a}Fe_{1-x}M_x(PO_{4-b})X_b$ (where, a is −0.5~0.5, x is 0~0.5, b is 0~0.1), but not limited thereto.

The positive electrode active material may be contained in 80.0~99.0 wt %, or preferably, in 95.0 to 98.0 wt %. With less than 80.0 wt % the positive electrode active material content, the secondary battery comprising the positive electrode active material can have considerably declining capacity and life characteristic, while with more than 99.0 wt % positive electrode active material, which will relatively reduce the contents of the conductive agent and the binder, conductivity of the positive electrode comprising the positive electrode active material, and bondability between the positive electrode active material and the positive electrode current collector can be compromised.

The conductive agent acts to impart conductivity between the positive electrode active material and the positive electrode current collector, and is not limited to any specific example, provided that it does not cause any chemical change in the battery concerned. For example, graphite such as natural graphite or artificial graphite; carbon black such as carbon black, acetylene black, ketjen black, channel black, furnace black, lamp black, or thermal black; a conductive fiber such as a carbon fiber or a metal fiber; a metal powder such as fluorinated carbon, aluminum, or nickel powder; a conductive whisker such as zinc oxide, potassium titanate; a conductive metal oxide such as titanium oxide; a conductive material such as polyphenylene derivatives, may be used as the conductive agent.

The conductive agent may be contained in 0.1~30.0 wt %, or preferably, in 1.0 to 5.0 wt %. With less than 0.1 wt % conductive agent, the insufficient amount of the conductive agent can cause difficulty of imparting conductivity between the positive electrode active material and the positive electrode current collector. Further, with more than 30.0 wt % conductive agent, which will relatively reduce the amount of positive electrode active material, the secondary battery can have deteriorated capacity and life characteristic.

The binder is an ingredient that helps to bind the positive electrode active material with the conductive agent and to the current collector, and for example, may be one, or two or more selected from the group consisting of polyvinylidene fluoride, polyvinyl alcohol, carboxymethyl cellulose (CMC), starch, hydroxyproylcellulose, regenerated cellulose, polyvinylpyrrolidone, tetrafluoroethylene, polyethylene, polypropylene, ethylene-propylene-diene terpolymer (EPDM), sulfonated EPDM, styrene-butylene rubber (SBR), fluorine rubber, and a variety of copolymers, although the binder may be any generally known binder without limitation.

The binder may be contained in 0.1~30.0 wt %, or preferably, in 1.0 to 5.0 wt %. With less than 0.1 wt % binder, bondability between the positive electrode active material and the conductive agent and the current collector can be deteriorated, while with more than 30.0 wt %, which will relatively reduce the amount of positive electrode active material, the secondary battery can have reduced life characteristic.

According to an exemplary embodiment of the present disclosure, the positive electrode material may additionally include an active material precursor, in addition to the positive electrode active material, the conductive agent, and the binder. The positive electrode material may additionally include, as an additive, the active material precursor which is the same substance as the active material precursor as a material of the positive electrode active material, so that the positive electrode suppresses Li consumption at the negative electrode in the event of low-current continuous discharge after over-discharge. Accordingly, rapid rise of the negative electrode voltage is prevented, thus preventing copper Cu from melting. Furthermore, enhanced over-discharge characteristics, such as prevention of capacity reduction after over-discharge and enhanced capacity recovery can be provided.

The active material precursor contained in the positive electrode material may include one, or two or more selected from the group consisting of manganese complex oxide precursor, iron phosphate complex oxide precursor, and nickel-cobalt-manganese complex oxide precursor, with the specific compositions as described above.

The amount of the active material precursor contained in the positive electrode material may range from 1.0 wt % to 5.0 wt % over the total weight of the positive electrode active material mixture, or preferably, may range from 2.0 wt % to 4.0 wt %. With less than 1.0 wt % the active material precursor, the insufficient active material precursor content can lead into difficulty of suppressing Li consumption at the negative electrode, and subsequent difficulty of enhancing over-discharge characteristic such as battery capacity reduction prevention and capacity recovery enhancement after over-discharge of the secondary battery comprising the active material precursor. Further, more than 5.0 wt % active material precursor can rather cause deteriorated capacity and life characteristic of the secondary battery.

According to another exemplary embodiment of the present disclosure, a preparation method of a positive electrode material is provided, including steps of: (a) preparing a positive electrode active material with an active material precursor and a lithium compound; and (b) mixing the prepared positive electrode active material, a conductive agent, a binder, and an active material precursor.

The active material precursor and the lithium compound used at step (a) of preparing the positive electrode active material with the active material precursor and the lithium compound, may use the active material precursor and the lithium compound described above.

The positive electrode material may be prepared by mixing the positive electrode active material prepared at step (a) with a conductive agent, a binder and an active material precursor, in which the preparation of the positive electrode material may include mixing of the conductive agent, the positive electrode active material and the active material precursor, and the binder in order. As described above, mixing at step (b) may include adding the active material precursor together with the positive electrode active material and mixing, when adding the positive electrode active material. The contents of the positive electrode active material, the conductive agent, the binder and the active material precursor are described above.

According to yet another exemplary embodiment of the present disclosure, a positive electrode comprising the positive electrode material described above is provided.

The positive electrode may be prepared by applying the positive electrode material according to an exemplary embodiment of the present disclosure over the positive electrode current collector, followed by drying and pressing.

The positive electrode current collector may be generally prepared to a thickness of 3 to 500 µm. The positive electrode current collector is not particularly limited to any specific example, as long as it exhibits high conductivity without causing a chemical change in the battery concerned. For example, stainless steel, aluminum, nickel, titanium, calcined carbon, or aluminum or stainless steel surface-treated with carbon, nickel, titanium, or silver may be used. The current collector may have minute bumps formed on a surface thereof to increase bondability of the positive electrode active material, and may have a variety of forms including film, sheet, foil, net, porous body, foam, or non-woven fabric.

According to yet another exemplary embodiment of the present disclosure, a secondary battery comprising the positive electrode described above is provided. The secondary battery may include the positive electrode according to the exemplary embodiment, a separator, a negative electrode, and an electrolyte.

For the separator, conventional porous polymer films used as traditional separators, for example, porous polymer films made of polyolefin-based polymers such as an ethylene homopolymer, a propylene homopolymer, an ethylene/butene copolymer, an ethylene/hexene copolymer, and an ethylene/methacrylate copolymer, may be used alone or as a laminate. Conventional porous non-woven fabrics, for example, non-woven fabrics made of a high-melting-point glass fiber, a polyethylene terephthalate fiber, and the like may be used as the separator, but not limited thereto.

The negative electrode may be prepared by applying a negative electrode active material over a negative electrode current collector, followed by drying and pressing, and may optionally and additionally include the conductive agent and the binder as described above as need arises.

The negative electrode current collector may be generally prepared to a thickness of 3 to 500 µm. The negative electrode current collector is not particularly limited to any specific example, as long as it exhibits conductivity without causing a chemical change in the battery concerned. For example, copper, stainless steel, aluminum, nickel, titanium, calcined carbon, copper or stainless steel surface-treated with carbon, nickel, titanium, or silver, or aluminum-cadmium alloy may be used as the negative electrode current collector. Further, like the positive electrode current collector, the negative electrode current collector may have minute bumps formed on a surface thereof to increase bondability of the negative electrode active material, and may have a variety of forms including film, sheet, foil, net, porous body, foam, or non-woven fabric.

Also, a lithium salt that may be included as an electrolyte may be used without limitation as long as it is generally used in the electrolyte for secondary batteries. For example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as a negative ion of the lithium salt.

According to an exemplary embodiment of the present disclosure, an organic solvent contained in the electrolyte may be used without limitation as long as it is generally used in the art, and for a representative example, may use at least one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxy ethane, diethoxy ethane, vinylene carbonate, sulfolane, γ-butyrolactone, propylene sulfite, and tetrahydrofuran.

Particularly, among the carbonate based organic solvents, ethylene carbonate and propylene carbonate, which are cyclic carbonates, may preferably be used, as they are organic solvents of high viscosity and have a high dielectric constant and thus effectively dissociate lithium salts in an electrolyte. More preferably, such a cyclic carbonate may be mixed with a linear carbonate of low viscosity and low dielectric constant, such as diethyl carbonate and dimethyl carbonate at a suitable ratio, as it is possible to make an electrolyte having high electric conductivity by doing so.

Optionally, the electrolyte may additionally include an additive such as overcharge preventing agent which is generally contained in a general electrolyte.

The secondary lithium battery may be completed by forming a battery structure in which a separator is interposed between the positive electrode according to the exemplary embodiment and a negative electrode, followed by winding or folding and inserting the electrode assembly into a cylindrical or angular shape battery case and then injecting an electrolyte. Alternatively, the secondary battery may be completed by laminating the battery structure into a bi-cell structure, followed by impregnating in electrolyte, introducing a resultant product into a pouch, and sealing.

Hereinbelow, certain embodiments of the present disclosure will be described in more detail. However, the exemplary embodiments are provided to help understand the present disclosure, and should not be construed as limiting in any meaning.

Example 1

1-1. Preparation of Positive Electrode Material

A positive electrode active material, $Li(Ni_{6.0}Mn_{2.0}Co_{2.0})O_2$, was prepared by mixing $(Ni_{6.0}Mn_{2.0}Co_{2.0})OOH$ and LiOH at 50:50 weight ratio and calcining at 800° C. under air atmosphere for 6 hr.

A positive electrode material was prepared by mixing 93.6% of the prepared positive electrode active material, 3.3 wt % super-p as a conductive agent, and 3.1 wt % polyvinylidenefluoride as a binder, and then mixing 2.8 wt % $(Ni_{6.0}Mn_{2.0}Co_{2.0})OOH$.

Over the total weight of the positive electrode active material mixture, 2.8 wt % $(Ni_{6.0}Mn_{2.0}Co_{2.0})OOH$ was added.

1-2. Preparation of Positive Electrode

A positive electrode was prepared by coating the prepared positive electrode material on one surface of aluminum (Al) foil current collector, followed by drying and rolling, and then punching out to a predetermined size.

1-3. Preparation of Negative Electrode

After preparing a negative electrode active material slurry by mixing artificial graphite, SBR binder, and viscosity agent at a weight ratio of 98:1:1, a negative electrode was prepared by coating the prepared slurry over a copper (Cu) foil current collector in a known manner.

1-4. Preparation of Secondary Battery

An organic solvent having compositions of ethylene carbonate (EC), propylene carbonate (PC), and diethyl carbonate (DEC) at a volume ratio of 3:2:5, and 1.0 M $LiPF_6$ were added to prepare a non-aqueous electrolyte solution.

Also, after interposing a polyolefin separator between the positive electrode prepared as described above and the negative electrode, a secondary battery was prepared by injecting the electrolyte solution.

Comparative Example 1

A secondary battery was prepared with the same method as Example 1, except that the positive electrode material was prepared by mixing only 93.8 wt % $Li(Ni_{6.0}Mn_{2.0}Co_{2.0})O_2$ as a positive electrode active material, 3.2 wt % super-p as a conductive agent, and 3.0 wt % polyvinylidenefluoride as a binder.

Comparative Example 2

A secondary battery was prepared with the same method as Example 1, except that the positive electrode material was prepared by mixing 5.8 wt % $(Ni_{6.0}Mn_{2.0}Co_{2.0})OOH$.

Experimental Example

1. Capacity Test

Capacity test was conducted with the secondary batteries prepared by the Examples and the Comparative Examples, under over-discharge condition (1.0~4.25V)

Charging and discharging conditions: $1^{st}$~$2^{nd}$ cycles—3.0~4.25V cut off $3^{rd}$~$50^{th}$ Cycles—1.0~4.25V cut off 2. Capacity Retention Ratio (%)

For the capacity retention ratio, the discharge capacity retention ratio at 50th cycle was calculated with reference to the discharge capacity at $3^{rd}$ cycle of the discharge done.

TABLE 1

| | Active material precursor (additive) wt % | Discharge capacity retention ratio % |
|---|---|---|
| Example 1 | 2.8 | 38.5 |
| Comparative Example 1 | 0 | 30.1 |
| Comparative Example 2 | 5.8 | 33.3 |

FIG. 1 is a graph showing a result of charging and discharging capacity tests of Example and Comparative Examples.

As shown in FIG. 1, the example where the positive electrode does not contain the active material precursor (Comparative Example 1), or the example where the positive electrode contains an excess amount of active material precursor (Comparative Example 2) exhibited higher discharge capacity than an example where the positive electrode material contains a certain wt % range of active material precursor at an initial stage of over-discharge, but this is attributable to the low charge capacity because the active material precursor was not able to exhibit capacity at the initial reactions ($1^{st}$, $2^{nd}$ cycles).

As the overcharge continues, it was observed that the Example comprising the active material precursor in the positive electrode exhibited increased discharge capacity after $6^{th}$ cycle, and superior discharge capacity retention ratio as the cycles continue.

Further, as indicated by [Table 1], it was observed that compared to the Comparative Examples, the Example comprising a certain amount of active material precursor in the positive electrode exhibited the discharge capacity retention ratio increased by 5 to 8% or above, after 50 charging and discharging cycles.

According to an exemplary embodiment of the present disclosure, it was observed that the positive electrode material additionally includes the active material precursor, and thus can provide enhanced over-discharge characteristics such as prevention of capacity declining after over-discharge, and enhanced capacity recovery.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art. Accordingly, it should be considered that all such proper alternatives, modifications and equivalents belong to the scope of the present disclosure.

What is claimed is:

1. A positive electrode material for a secondary lithium battery comprising:
   a positive electrode active material mixture comprising a positive electrode active material prepared from an active material precursor and a lithium compound, a conductive agent, and a binder; and
   an active material precursor as an additive,
   wherein the active material precursor as the additive is a same substance as the active material precursor as a material of the positive electrode active material, and
   the active material precursor is nickel-cobalt-manganese complex oxide precursor,
   wherein
   the nickel-cobalt-manganese complex oxide precursor has a composition of Formula 4 below:

$$M_yP \qquad \text{[Formula 4]}$$

where, $M=M'_{1-k}A_k$, M' is $Ni_{1-a-b}(Ni_{1/2}Mn_{1/2})_aCo_b$, $0.65 \le a+b \le 0.85$, $0.1 \le b \le 0.4$, A is a dopant, $0 \le k \le 0.05$, $0.95 \le y \le 1.05$, and P is one or more selected from the group consisting of —OH, —OOH, and —$CO_3$, and
   the positive electrode active material has a composition of formula $LiM_yO_2$, where M and y are same as M and y in the above Formula 4.

2. The positive electrode material of claim 1, wherein the lithium compound is one, or two or more selected from the group consisting of lithium carbonate ($Li_2CO_3$), lithium hydroxide (LiOH), lithium nitrate ($LiNO_3$), and lithium hydrate ($LiOHH_2O$).

3. The positive electrode material of claim 1, wherein the positive electrode active material mixture comprises 80.0-99.0 wt % positive electrode active material, 0.1-30.0 wt % conductive agent, and 0.1-30.0 wt % binder, and the positive electrode material comprises 1.0-5.0 wt % active material precursor as an additive, over a total weight of the positive electrode active material mixture.

4. The positive electrode material of claim 3, wherein the positive electrode active material mixture comprises 92.0-97.0 wt % positive electrode active material, 1.0-5.0 wt % conductive agent, and 1.0-5.0 wt % binder, and the positive electrode material comprises 2.0-4.0 wt % active material precursor as an additive, over a total weight of the positive electrode active material mixture.

5. A method for preparing the positive electrode material of claim 1, comprising steps of:
   (a) preparing a positive electrode active material with an active material precursor and a lithium compound; and
   (b) mixing the prepared positive electrode active material, a conductive agent, a binder, and an active material precursor as an additive.

6. The method of claim 5, wherein the active material precursor as the additive at step (b) is added together with the positive electrode active material and mixed, when the positive electrode active material is added.

7. A positive electrode comprising the positive electrode material of claim 1.

8. A secondary battery comprising the positive electrode of claim 7.

* * * * *